United States Patent
Cheng et al.

(10) Patent No.: US 11,916,964 B2
(45) Date of Patent: Feb. 27, 2024

(54) DYNAMIC, RUNTIME APPLICATION PROGRAMMING INTERFACE PARAMETER LABELING, FLOW PARAMETER TRACKING AND SECURITY POLICY ENFORCEMENT USING API CALL GRAPH

(71) Applicant: ArecaBay, Inc., San Mateo, CA (US)

(72) Inventors: Lebin Cheng, Saratoga, CA (US); Ravindra Balupari, Dublin, CA (US); Sekhar Babu Chintaginjala, Karnataka (IN); Ankit Kumar, Karnataka (IN); Sandeep Yadav, South San Francisco, CA (US)

(73) Assignee: ArecaBay, Inc., San Mateo, CA (US)

( * ) Notice: Subject to any disclaimer, the term of this patent is extended or adjusted under 35 U.S.C. 154(b) by 316 days.

(21) Appl. No.: 17/338,611

(22) Filed: Jun. 3, 2021

(65) Prior Publication Data

US 2021/0385252 A1    Dec. 9, 2021

Related U.S. Application Data

(60) Provisional application No. 63/034,191, filed on Jun. 3, 2020.

(51) Int. Cl.
*H04L 9/40* (2022.01)
*G06F 21/52* (2013.01)
(Continued)

(52) U.S. Cl.
CPC .............. *H04L 63/20* (2013.01); *G06F 21/52* (2013.01); *G06F 21/554* (2013.01); *G06N 5/01* (2023.01);
(Continued)

(58) Field of Classification Search
CPC ..... H04L 63/20; H04L 67/133; H04L 63/168; G06N 5/01; G06F 21/52; G06F 21/554
See application file for complete search history.

(56) References Cited

U.S. PATENT DOCUMENTS 9,158,604 B1 * 10/2015 Christodorescu ....... G06F 9/547
10,922,625 B2 * 2/2021 Ma ..................... G06F 16/24564
(Continued)

OTHER PUBLICATIONS

Ki et al. (A Novel Approach to Detect Malware Based on API Call Sequence Analysis, Hindawi Publishing Corporation, International Journal of Distributed Sensor Networks, vol. 2015, Article ID 659101) (Year: 2015).*

*Primary Examiner* — Matthew Smithers
*Assistant Examiner* — Shu Chun Gao
(74) *Attorney, Agent, or Firm* — Womble Bond Dickinson (US) LLP

(57) ABSTRACT

A multi-API security policy that covers multiple API calls of a transaction is dynamically enforced at runtime, without access to the specification or code of the APIs. Calls made to APIs of the transaction are logged, and the logs are read. Data objects used by the APIs are identified. Specific data labels are assigned to specific fields of the data objects, consistently identifying data fields of specific types. Linkages are identified between specific ones of the multiple APIs, based on the consistent identification of specific types of data fields. An API call graph is constructed, identifying a sequence of API calls made during the transaction. The call graph is used to enforce the security policy, by tracking the flow of execution of the multi-API transaction at runtime, and detecting actions that violate the security policy. Security actions are taken responsive to the detected actions that violate the policy.

17 Claims, 10 Drawing Sheets

(51) Int. Cl.
  *G06F 21/55* (2013.01)
  *H04L 67/133* (2022.01)
  *G06N 5/01* (2023.01)

(52) U.S. Cl.
  CPC .......... *H04L 63/168* (2013.01); *H04L 67/133* (2022.05); *G06F 2221/033* (2013.01)

(56) References Cited

U.S. PATENT DOCUMENTS 11,108,828 B1* 8/2021 Curtis ..................... H04L 63/20
2019/0213326 A1* 7/2019 Dykes ................... G06F 21/552

* cited by examiner

US 11,916,964 B2

DYNAMIC, RUNTIME APPLICATION PROGRAMMING INTERFACE PARAMETER LABELING, FLOW PARAMETER TRACKING AND SECURITY POLICY ENFORCEMENT USING API CALL GRAPH

CROSS-REFERENCE TO RELATED APPLICATION

The present application claims the benefit under 35 U.S.C. § 119(e) of U.S. Provisional Patent Application Ser. No. 63/034,191, entitled "Methods of API Data Risk Assessment and Policy Enforcement Based on Customizable API Specification Analysis, Parameter Labeling and Flow Parameter Tracking," filed on Jun. 3, 2020 and having the same assignee, the entire contents of which are incorporated herein by reference.

TECHNICAL FIELD

This disclosure pertains generally to computer security, and more specifically to dynamic, runtime API parameter labeling, flow parameter tracking and security policy enforcement, using an API call graph, without access to an API specification.

BACKGROUND

Enterprises are opening up their applications for API access driven by factors such as the mobility of their users and the growing popularity of Internet of Things (IoT) devices. This exposes applications to a new set of security risks at the API level, exacerbated by the lack of effective methods to monitor API level data flows. In addition, new generations of enterprise applications are increasingly being built with a distributed architecture relying on multiple services provided by different entities. Conventional security systems do not have visibility into the API calls between such services to fully monitor all data flows, leading to increased exposure.

Conventional API security depends on API developers providing accurate API specifications, and then statically analyzing the specifications against security concerns. This approach assumes the existence of an accurate and current API specification, which is often nonexistent or unavailable to parties outside of the developer's organization. Even when an accurate API specification is created and available (which is often not the case), software development cycles are so rapid and updates are rolled out so quickly, that API specifications quickly become out of date, and are often not updated accurately or at all.

Furthermore, critical security information about data fields, such as the level of data sensitivity, is usually missing in the API specification. This may happen because conventional security tools either lack the capability to process API parameter level data or are not capable of maintaining an updated specification as the API evolves. As a result, the security policies enforced at the data field level must be applied after-the-fact by security professionals who often have to manually adjust policies when the data field schema changes. Such policy enforcement is not effective because frequent change in application modifications result in unpredictable changes in data fields, resulting in policy mismatch.

In a highly distributed system with a service oriented architecture, data flows from one application service to another in order to complete one transaction. Each segment of this flow is an API call between application services. Conventional means of monitoring individual API calls fail to provide a complete end-to-end view of the entire flow. Some conventional methods rely on injected headers or service code instrumentation to add tracing "beacons" into each of the calls to facilitate tracing. Such reliance on additional tracing information severely limits the applicability of these tracing mechanisms, since trace IDs require API level modification.

It would be desirable to address these issues.

SUMMARY

A multi-API security policy that covers multiple API calls of a multi-API transaction is dynamically enforced at runtime. This can be done without having access to the specification or code of any of the multiple APIs. Calls made to multiple APIs of a multi-API transaction are logged, and the logs are read. A multi-API call transaction may include a call to an initial API, and calls made to subsequent APIs by the initial API and by other subsequent APIs.

Data objects used by the multiple APIs are identified at runtime. A data object used by an API can be in the form of one or more parameters passed into the API, a value returned by the API, a data object read from and/or written to by the API, etc. Specific data labels can be assigned to specific fields of the data objects used by the multiple APIs, at runtime. The specific data labels consistently identify data fields of specific types. To label the data fields, the data objects used by the APIs can be programmatically analyzed, for example by using a trained machine learning model, or by using heuristics.

A data label that identifies the specific data type is automatically assigned to each one of the identified data fields, such that each data field of each specific type is consistently labeled, regardless of how the specific types of data are identified at the level of the API specification or code. The multi-API security policy that covers multiple API calls of the multi-API transaction can be defined to prohibit specific actions concerning data fields of specific types across the multiple APIs. The data fields of specific types are also consistently identified in the security policy, using the same specific data labels described above.

Linkages are identified between specific ones of the multiple APIs, based on the consistent identification of data fields of specific types across the multiple APIs. This can take the form of identifying one or more one common data field(s) used by multiples ones of the APIs, where the common data fields have been assigned the same label, regardless of how the specific data fields are referenced by the APIs.

An API call graph is constructed, identifying a sequence of API calls made during the multi-API transaction. To construct the API call graph, limited information that is available concerning the multiple APIs and relationships between them can be grouped in a candidate superset graph. The candidate superset graph can be grown by an iterative edge elimination process, to create the API call graph by determining neighbors of all service endpoints. This can take the form of utilizing a linear regression model to determine neighbors of service endpoints. For example, the identifying linkages between specific ones of the multiple APIs can be utilized to determine neighbors.

The API call graph identifying the sequence of API calls can be used to enforce the multi-API security policy. For example, the API call graph can be used to track the flow of execution of the multi-API transaction at runtime, and to detect actions in the tracked flow of execution that violate the multi-API security policy. For example, an action can be detected in the tracked flow execution of the multi-API transaction that attempts to gain unauthorized access to sensitive data, such as credit card numbers or home addresses, in violation of the multi-API security policy. In response to detecting the violation of the multi-API security policy, a security action can be executed at runtime, such as blocking execution of the detected action.

The features and advantages described in this summary and in the following detailed description are not all-inclusive, and particularly, many additional features and advantages may be apparent to one of ordinary skill in the relevant art in view of the drawings, specification, and claims hereof. Moreover, should be noted that the language used in the specification has been principally selected for readability and instructional purposes, and may not nave been selected to delineate or circumscribe the inventive subject matter, resort to the claims being necessary to determine such inventive subject matter.

The Figures depict various implementations for purposes of illustration only. One skilled in the art will readily recognize from the following discussion that other implementations of the structures and methods illustrated herein may be employed without departing from the principles described herein.

DETAILED DESCRIPTION

Figure 1:
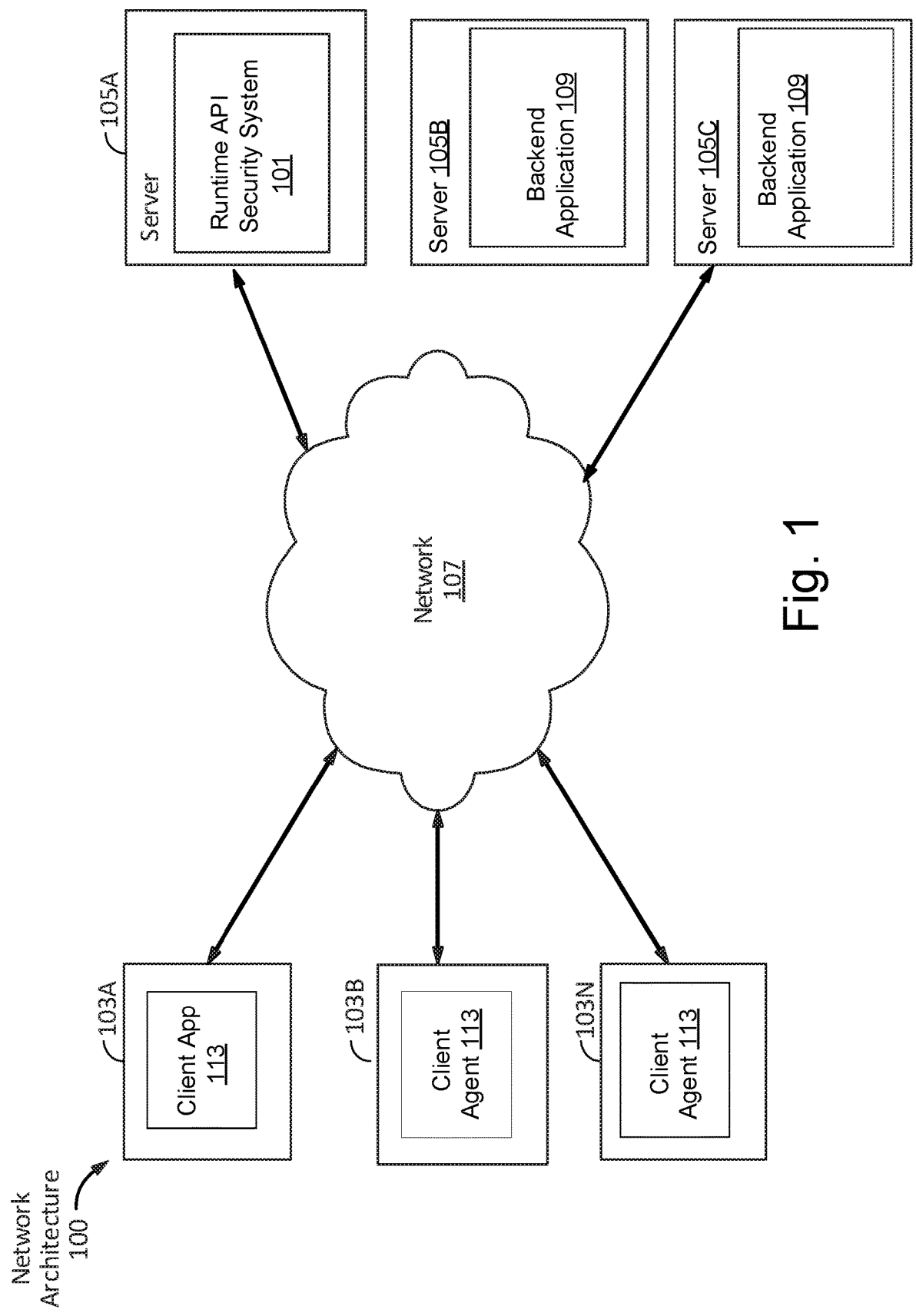
FIG. 1 illustrates a network environment in which a runtime API security system can operate, according to some implementations.
Figure 2:
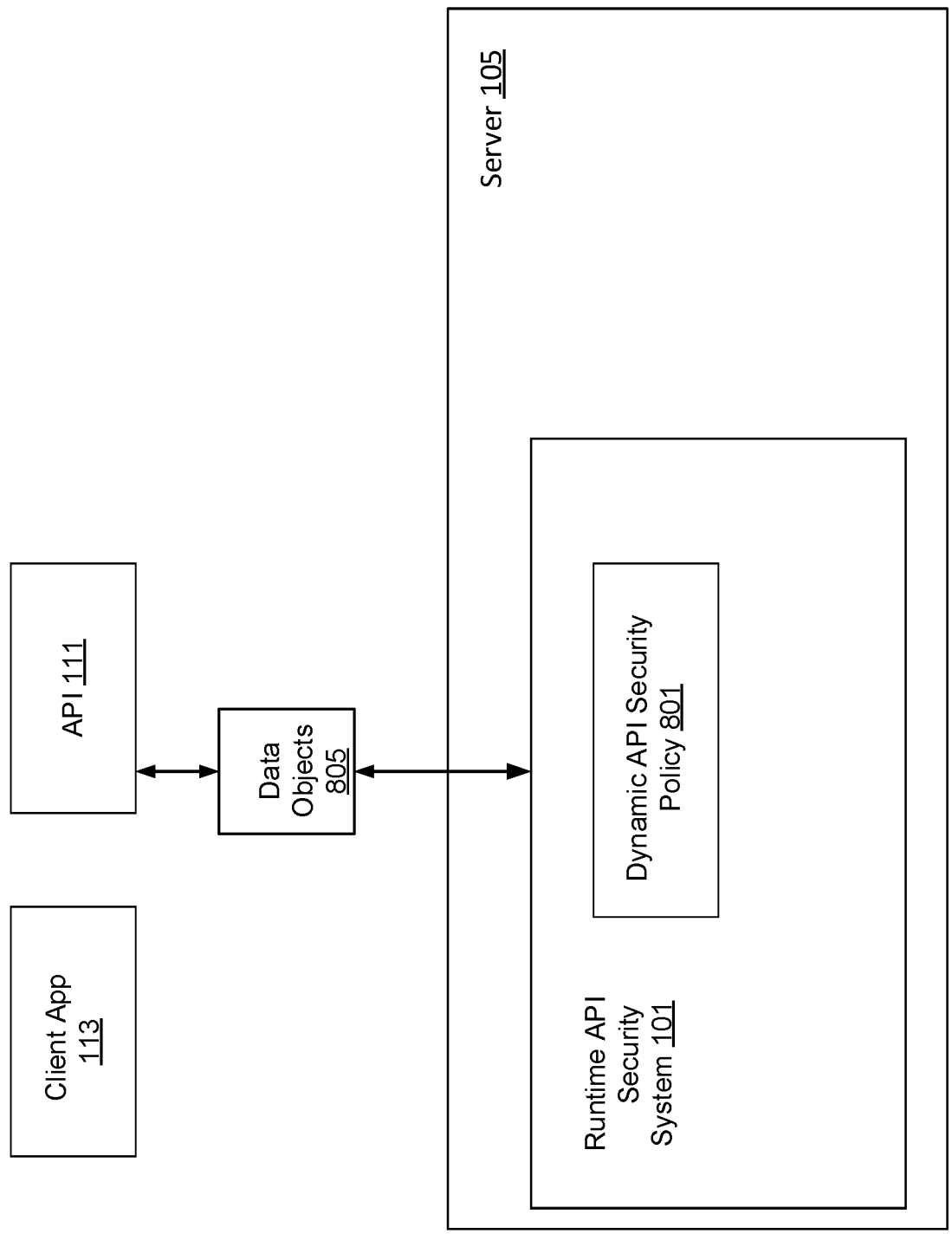
FIG. 2 illustrates the operation of a runtime API security system, according to some implementations.

FIG. 1 is a high-level block diagram illustrating an exemplary network architecture 100 in which a runtime API security system 101 can be implemented. Referring to FIG. 1, the illustrated network architecture 100 comprises multiple clients 103A, 103B, and 103N (together may be referred to as "client 103") as well as multiple servers 105A, 105B, and 105N (together may be referred to as "server 105"). In FIG. 1, the runtime API security system 101 is illustrated as residing on the server 105A. It is to be understood that this is an example only. In various implementations, various functionalities of the runtime API security system 101 can be instantiated on a server 105, a client 103, or can be distributed among multiple servers 105 and/or clients 103. Also in FIG. 1, a first backend application 109$_{FIRST}$ with a first API 111$_{FIRST}$ is illustrated as residing on the server 105B, and a second backend application 109$_{SEC-OND}$ with second API$_{SECOND}$ is illustrated as running on server 105N. Although only two backend applications 109 are illustrated in FIG. 2, in practice many more backend applications 109 may be present.

The clients 103 can be in the form of computing devices operated by users that access one or more backend applications 109, for example by a client app 113 running on the client 103 interfacing with the first API 111$_{FIRST}$ (i.e., the API 111 exposed by the backend application 109). For example, a client app 113 could be in the form of a smartphone app used by delivery service drivers to accept and manage delivery assignments, whereas the corresponding backend application 109 (e.g., the first backend application 109$_{FIRST}$) could be in the form of the backend application provided by the delivery service. When a driver interacts with the given backend application 109 by using the client app 113 on his/her phone, the client application 113 utilizes the API 111 of the backend application 109. The second backend application 109$_{SECOND}$ can be, for example, an authentication service called by the delivery service, in order to authenticate the credit card of the end user to whom an order is being delivered. In this example, the first backend application 109$_{FIRST}$ (the delivery service) calls the second the backend application 109$_{SECOND}$ (the authentication service) via the second API$_{SECOND}$, which is exposed by the authentication service. This is just an example, and in practice many types of client apps 113 and backend applications 109 are possible. A single backend application 109 called by a client app 113 may call multiple additional backend applications (e.g., authentication services, mapping applications, financial service providers, etc.), and such API calls may be nested multiple layers deep.

Clients 103 and servers 105 can be implemented using computer systems 610 such as the one illustrated in FIG. 10 and described below. The clients 103 and servers 105 are communicatively coupled to a network 107, for example via a network interface 248 as described below in conjunction with FIG. 4. Clients 103 are able to access applications and/or data on servers 105 using, for example, a web browser or other client software such as a client app 113. Clients 103 may be in the form of laptops, desktops and/or other types of computers/computing devices, including mobile computing devices, comprising portable computer systems capable of connecting to a network 107 and running applications (e.g., smartphones, tablet computers, wearable computing devices, etc.). Servers 105 can be in the form of, e.g., rack-mounted computing devices, located, e.g., in data centers. It is to be further understood that one than one application 109 can run on a single physical server 105 using virtualization.

Although FIG. 1 illustrates three clients 103 and three servers 105 as an example, in practice many more (or fewer) clients 103 and/or servers 105 can be deployed. In one implementation, the network 107 is in the form of the internet. Other networks 107 or network-based environments can be used in other implementations.

FIG. 2 illustrates the operation of a runtime API security system 101, running on a server 105 according to some implementations. As described above, the functionalities of the runtime API security system 101 can reside on a server 105 or other specific computer 610, or be otherwise distributed between multiple computer systems 610, including within a cloud-based computing environment in which the functionality of the runtime API security system 101 is provided as a cloud-based service over a network 107. It is to be understood that although the runtime API security system 101 is illustrated in FIG. 2 as a single entity, the runtime API security system 101 represents a collection of functionalities, which can be instantiated as a single or as multiple modules, as desired. In some implementations, the different modules of the runtime API security system 101 can reside on different computing devices 610 as desired. Each client app 113 can be instantiated as an application configured to run under an operating system such as Windows, OS X, Linux, etc., or as an app for a given mobile operating system (e.g., Android, iOS, Windows 10, etc.), with different client agents 109 being specifically implemented for different types of operating environments utilized by different end users.

It is to be understood that the components and modules of the runtime API security system 101 can be instantiated (for example as object code or executable images) within the system memory 617 (e.g., RAM, ROM, flash memory) of any computer system 610, such that when the processor 614 of the computer system 610 processes a module, the computer system 610 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the runtime API security system 101 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

As illustrated in FIG. 2, the runtime API security system 101 can enforce a dynamic API security policy 801 at runtime. The dynamic API security policy 801 may define rules and/or desired API security practices, to protect against malicious parties exploiting an API call (e.g., in order to steal sensitive information or the like). As noted above, conventional API security policies are based on API specifications provided by developers of the APIs, and are enforced statically. By contrast, the runtime API security system 101 enforces a dynamic API security policy 801 at runtime, without requiring access to the API specification or code. As described in detail below, the runtime API security system 101 uses consistent labels to identify specific types of data fields used by APIs 111. The dynamic API security policy 801 is defined to consistently refer to data fields of specific types by using these same specific data labels, regardless of how the specific types of data may be referred to an API 111 itself, or at an API specification or code level. This enables defining the dynamic API security policy 801 without access to the API specification or code, and enforcement of the dynamic API security policy 801 at runtime when the API 111 is called.

More specifically, the runtime API security system 101 detects in real-time when a call is made to an API 111 to be dynamically secured. The runtime API security system 101 then identifies a data object 805 used by the API 111, at runtime. It is to be understood that the data object 805 is the structure of the data that is acted on by the API 111. This can be in the form of one or more parameters passed into the API 111 and/or passed from the API to one or more called subroutines (either by value or by reference, e.g., as an address of an object with multiple fields to which the API can read and/or write). The data object 805 may also comprise a value returned by the API (which can be in the form of the address of an object). In other words, whatever data is acted on by the API is identified at API runtime. An API's data object 805 typically includes multiple fields (e.g., multiple parameters acted on by the API 111, such as a user name, address, social security number, credit card, etc.). The application level implementation, structure and naming of the data acted on by an API change frequently, as underlying code is updated. In current development practices, code updates are rolled out frequently as they become available, sometimes weekly or even daily. However, the underlying data tends to stay the same (e.g., a user name is still a user name whether internally referred to as user name, User-Name, uName, User→name, etc.). Thus, the runtime API security system 101 assigns specific data labels to specific fields of an API's data object 805, at runtime, where the specific data labels consistently identify data fields of specific types (e.g., user names, social security numbers, geo-locations, etc.). As noted above, these same data labels are used in the dynamic API security policy 801 which is enforced against the API at runtime.

In different implementations, different techniques can be used to identify and label specific types of data fields of a data object 805 at runtime. For example, the runtime API security system 101 may programmatically analyze a data object 805 used by an API 111, at runtime, and identify specific types of data fields of the data object by using a machine learning model trained to identify relevant data types (e.g., first names, last names, addresses, social security numbers, or whatever types of data fields are relevant to the given API application). In another implementation, the runtime API security system 101 may use heuristic analysis to identify specific types of data fields. The runtime API security system 101 automatically assigns a data label to each one of the identified data fields based on its determined data type, where each assigned data label consistently identifies a corresponding specific type. In another implementation, data fields that conform to certain predefined rules may be identified. For example, a set of rules can be used to further determine whether a series of digits is a credit card number.

Figure 3:
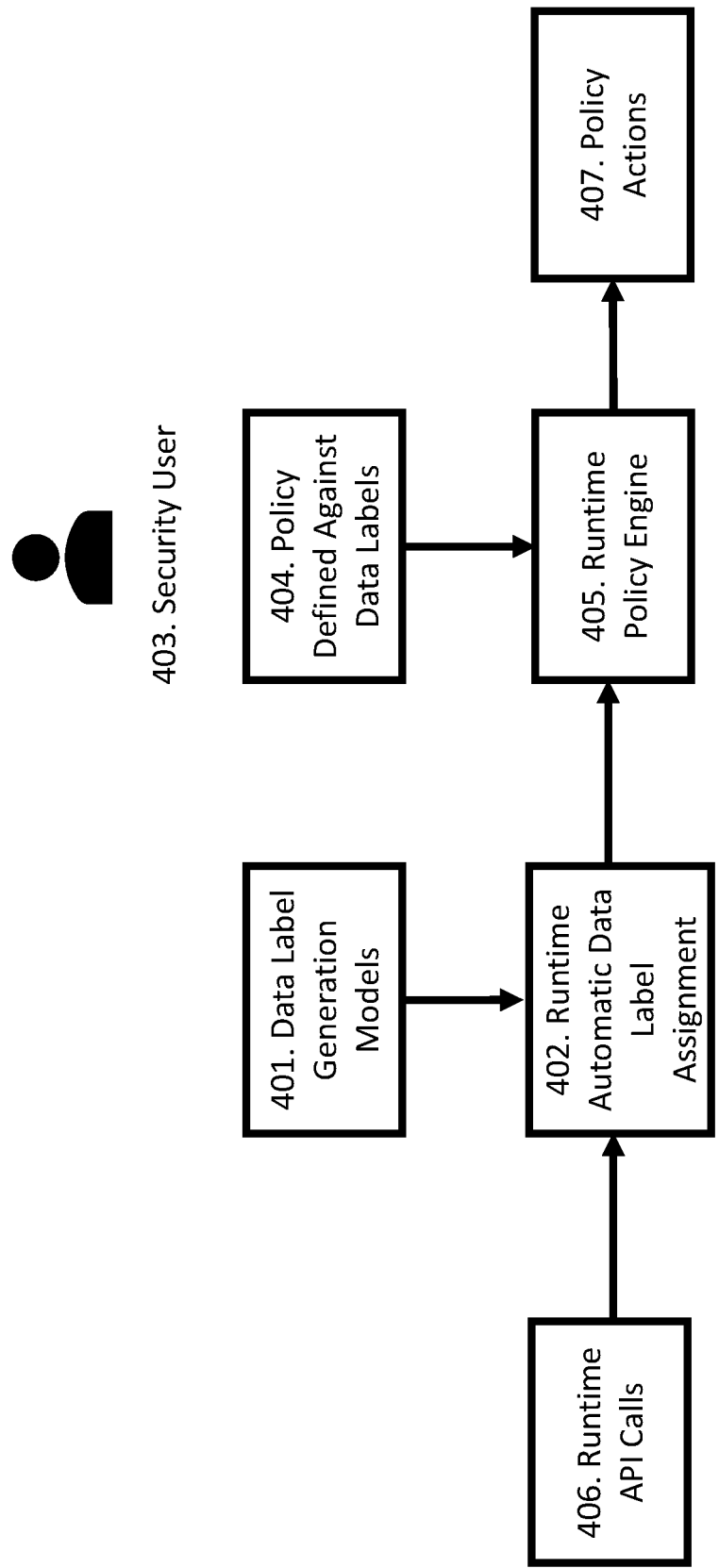
FIG. 3 illustrates identifying and labeling data types and enforcing a runtime security policy, according to some implementations.

Referring now to FIG. 3, some example implementations of the use of a machine learning model to identify relevant data types are discussed. As shown in FIG. 3, various trained data label generation machine learning models 401 may be configured to drive the automated runtime assignment 402 of data labels to data fields of specific types. Machine learning models are built and trained to automatically identify different types of data fields and label them accordingly. For example, in one implementation a machine learning model is trained to automatically identify a string value having a specific format and context as a user name. Such a model develops features which describe a user name if found in an API parameter value. As other examples, a machine learning model may be trained for identification of street addresses, cities, other geo-locations, credit card numbers, social security numbers, passwords, business names, etc. In some implementations, the machine learning model may be trained on a dataset comprising real-world and/or synthetic data samples.

Different labeling methodologies may be used in different implementations. In one implementation, the data field identification and labelling techniques described in issued U.S. Pat. No. 10,452,843 titled "Self-adaptive Application Programming Interface Level Security Monitoring" and having the same assignee are used. Issued U.S. Pat. No. 10,452,843 is incorporated herein by reference. Because the data fields of the data object 805 of an API 111 are consistently labelled according to type, the rules and policies of the dynamic API security policy 801 can be defined using the same consistent labelling of data types, and dynamically enforced at runtime, regardless of how the data fields are referenced by the API code and/or specification, and without access to those resources.

Returning to FIG. 2, it is to be understood that to enforce the dynamic API security policy 801, the flow of execution of an API may be tracked, and the runtime API security system 101 detects if an action in the tracked flow of execution violates the dynamic API security policy 801. For example, it can be detected at runtime that a specific action in the tracked flow of execution attempts to gain access to sensitive data in violation of the dynamic API security policy. Suppose the dynamic API security policy 801 states that a specific API call that looks up customer addresses can only be legitimately used to request up to three addresses at a time. If a call to the API requests 10,000 addresses, this can be flagged as an action in violation of the dynamic API security policy 801. Of course, this is just one example, and the dynamic API security policy 803 can indicate rules and policies for specific APIs at any level of granularity. When a violation of the dynamic API security policy 801 is detected, a security action may be performed at runtime in response. For example, the execution of an action in the tracked flow of execution found to violate the security policy can be blocked (e.g., the request for 10,000 address can be blocked from executing). Other actions can be taken in response to violations of the security policy as desired, such as locking data stores, terminating network connections, transmitting notifications of the violation to various target parties, etc.

As noted above, dynamic API security policies 801 can be defined at any desired level of granularity, using the consistent labelling of specific data types described above. A dynamic API security policy 801 can define rules that ensure that certain data input and/or output of an API call follows desired constraints. The determining factor of applicable constraints is not the naming of a particular data field by the API, but rather the nature of the data. Using the data labeling described herein, the API security policy can then be defined against the consistent data labels rather than particular API parameter names, which vary and are subject to change. In different implementations, dynamic API security policies 801 can be defined by various security users 403, such as enterprise-level security administrators, IT professionals, etc.

Turning back to FIG. 3, in one implementation a security user 403 configures a dynamic API security policy 801 using known data labels. The resulting dynamic API security policy 801 may be loaded 404 into a runtime policy engine 405, which is a component of the runtime API security system 101. API calls at runtime 406 are processed by the automatic runtime assignment 402 of data labels to data fields of specific types as described above. The API calls, with consistent labels now applied to specific data fields of specific types, may then be processed by the runtime policy engine 405. Policy actions 407 are triggered if a policy match occurs (e.g., if an action of the API violates the dynamic API security policies 801).

In some implementations, the flow of execution initiated by an API is tracked into at least one subroutine called by the API, at runtime, for example by using an API call graph 506 identifying a sequence of API calls, as described in detail below in connection with FIGS. 7-9. In that scenario, the data object(s) of the subroutine(s) into which the flow of execution is traced are identified, and specific data labels are consistently assigned to the specific fields thereof as described above. Action(s) performed by the tracked subroutine(s) that violate(s) the dynamic API security policy 801 can be detected and protected against as described above. A call by an API to subroutine can be in the form of a subsequent API call.

Figure 4:
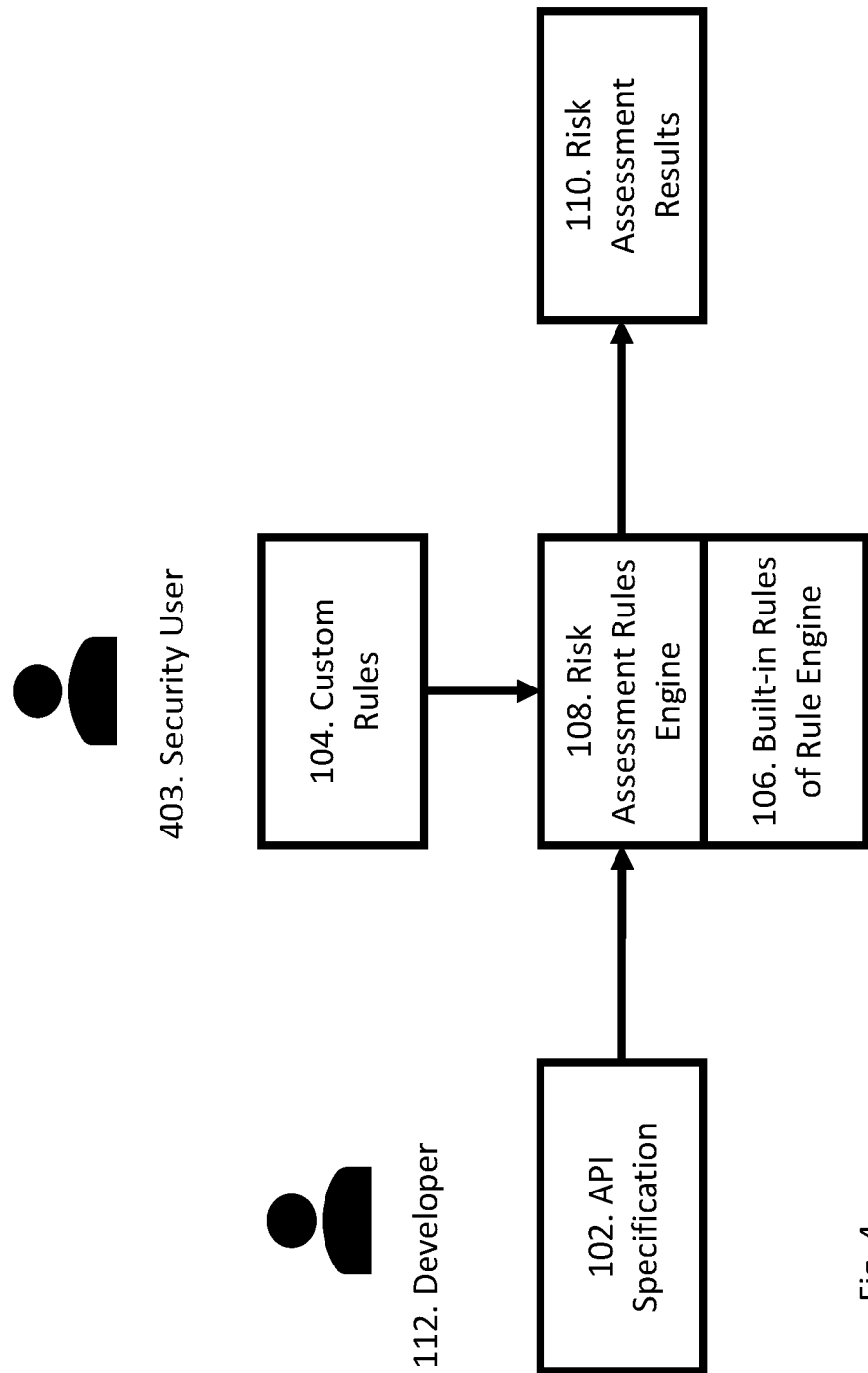
FIGS. 4, 5 and 6 illustrate security processing of an API specification, according to some implementations.
Figure 5:
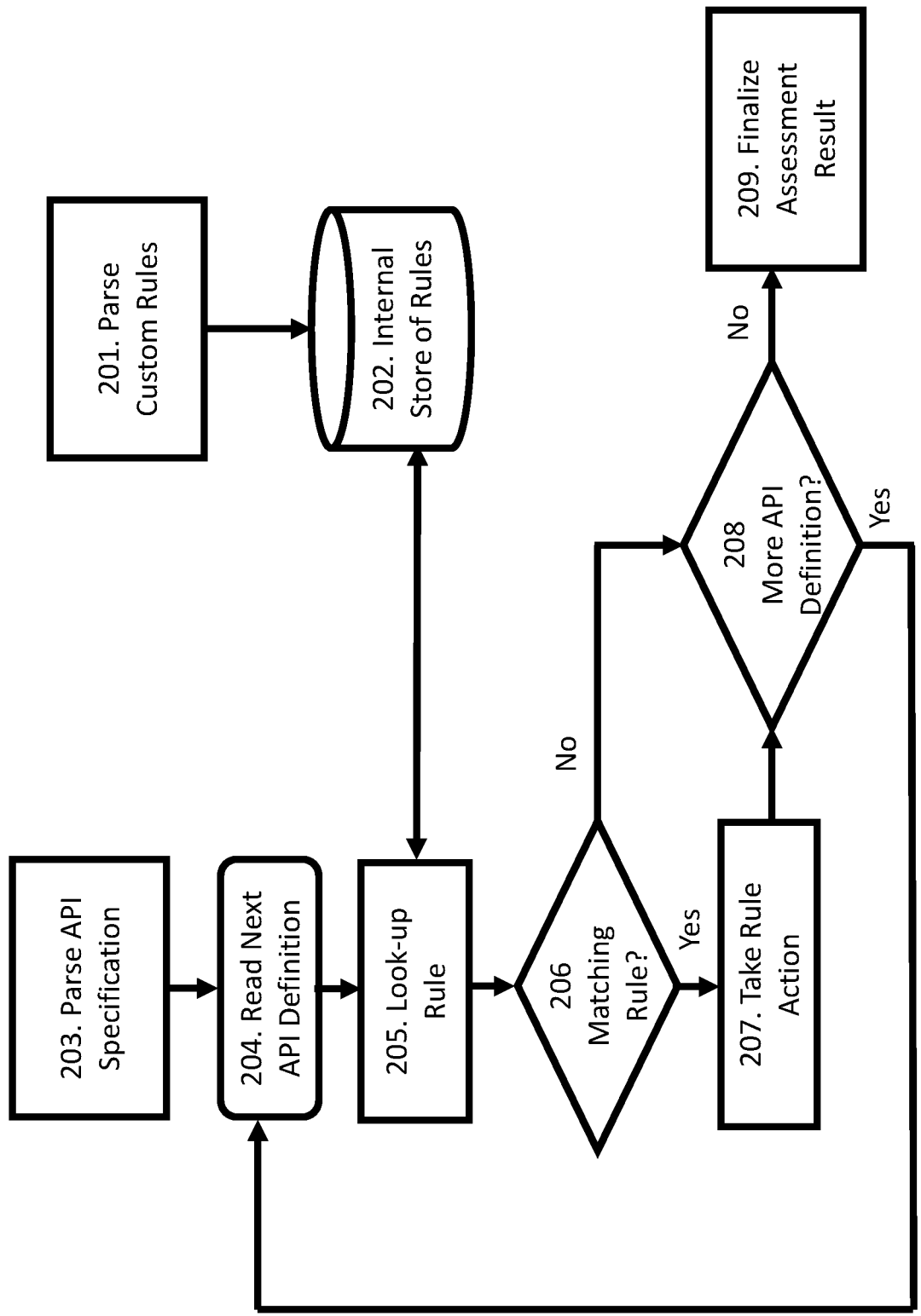
Figure 6:
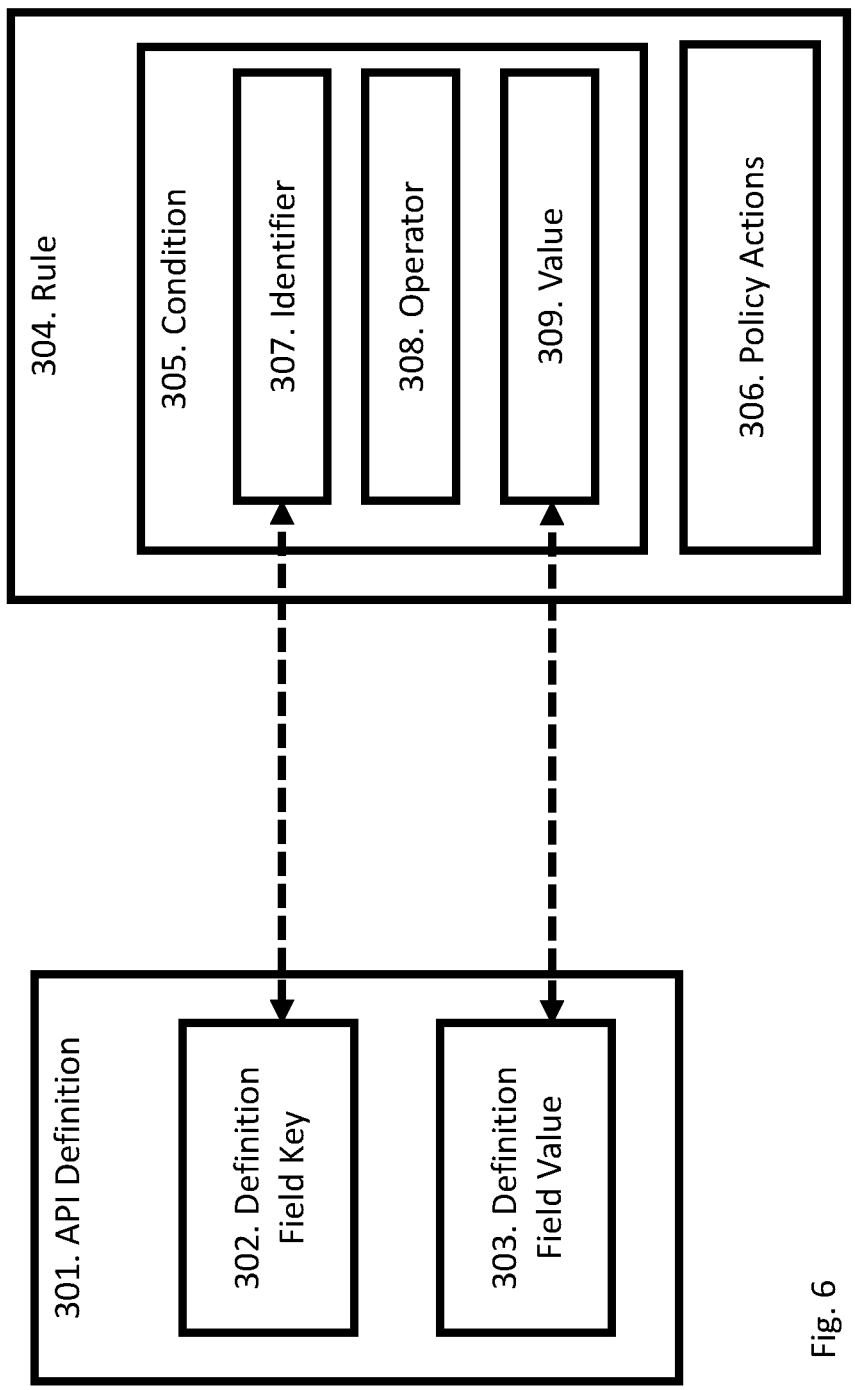

Turning now to FIGS. 4, 5 and 6, in some implementations, the dynamic API security techniques described above may be supplemented with static API security analysis of an API specification 102 and a set of rules concerning API risk assessment. Although the dynamic API security described above does not require an API specification to work, in the case when API specifications are produced by developers, it is a sound security practice to assess the data exposure risk of an application's APIs before it is deployed into production. Assessing API specifications against security best practice rules can minimize security risks of an API due to basic mistakes. In this scenario an API specification 102 is received, for example from a developer 112 of the API 111, as illustrated in FIG. 4. The set of rules may include organization-defined or custom rules 104 concerning organization-defined API risk assessment. These custom rules 104 may be defined by a security user 403. The rules may also include default, or built-in rules 106. A risk assessment rules engine 108 (which may be implemented as a component of the runtime API security system 101) compares all and the custom rules 104 and built-in rules 106 against the API specification 102 to determine risk assessment results 110.

Turning now to FIG. 5, the operation of the risk assessment rules engine 108 is described in more detail, according to one implementation. The risk assessment rules engine 108 may parse the custom rules 201 and store the processed versions thereof in a rule store 202 in which the built-in rules are stored. Any suitable storage mechanism can be used in this capacity, such as database or an in-memory data structure. The risk assessment rules engine 108 may then parse 203 the API specification 111, resulting a collection of API definitions. The risk assessment rules engine 108 reads 204 each definition of the API specification and compares 205 it to the plurality of rules concerning API risk assessment. If there is a matching rule 206, a specific policy action defined in the matching rule will be taken 207 to remediate the risk associated with the affected particular API definition. In other words, corresponding security actions may be taken in response to a definition in the API specification triggering a specific rule. As the risk assessment rules engine 108 cycles 208 through the definitions of the API specification, multiple security actions may be taken, in response to multiple definitions in the specification triggering specific rules. In addition, when a definition triggers a rule, a quantification of the risk assessment of the API may be adjusted accordingly. After all of the API definitions have been processed, the quantification of the risk assessment for the given API 111 is finalized 209.

FIG. 6 illustrates details of how a rule is matched against an API definition 301, according to one example implementation. In this example implementation, rules 304 can be expressed in a JSON-format rule definition language. Each rule 304 is composed of conditions 305, each of which consists of an identifier 307, an operator 308, and a value 309. Multiple conditions may be combined using the AND, OR and XOR operators to build a more comprehensive rule 304. Identifier keywords span groups of fields to match one or more field key names 302 of API definitions 301 in the target API specification. Conditions support comparison operators, for one example, these operators can be one of, but not limited to, "<" (less than), ">" (greater than), "="

(equals), "is-missing," "pattern-match," or "is-empty". For each defined custom rule, a policy action may be defined to determine a risk score and a category to which the risk belongs.

In one implementation, a specification is converted into a tree for parsing. Each API definition represents a collection of nodes in such a tree. The identifier 307 is used to match against the node's definition field keys 302. The corresponding field value 303 is then extracted. Operator 308 is used to evaluate whether a match occurs. If a match occurs, the corresponding score triggers policy actions 306. At the end of the processing of each API specification, a risk assessment report may be produced using the individual risk scores to compute the overall risk by recursively applying an aggregation function.

In some implementations, the runtime API security system 101 dynamically enforces a multi-API security policy that covers multiple API calls of a multi-API transaction. It is common for the server of an API to call additional APIs to perform various services. For example, a ride sharing app may use many third-party services in the course of a single transaction, such as an payment card validation service to authorize a user's credit card, a geo-location service to track the current position of an automobile, a mapping service to provide directions to the driver, and so on. Each called API server may in turn call additional APIs, and this execution flow can be nested many levels deep. There is a current trend in software development toward the isolation of different functionalities into separate microservices. Especially in this context, many APIs may be called to complete a given transaction. Every service utilized in a transaction may potentially be a point of attack by a malicious party. Consequently, the risk associated with a particular transaction is informed by the risks posed by all of the services involved. To address these concerns, multi-API security policies that covers the multiple API calls of a multi-API transaction can be defined and enforced by the runtime API security system 101, as described in detail below.

In order to provide dynamic multi-API transaction level security, the runtime API security system 101 can leverage the logs of calls to multiple APIs of a multi-API transaction, and the consistent labelling functionality described above in order to generate an API call graph 506 identifying a sequence of API calls made during the multi-API transaction. The API call graph can then be used in the enforcement of a multi-API security policy.

Figure 7:
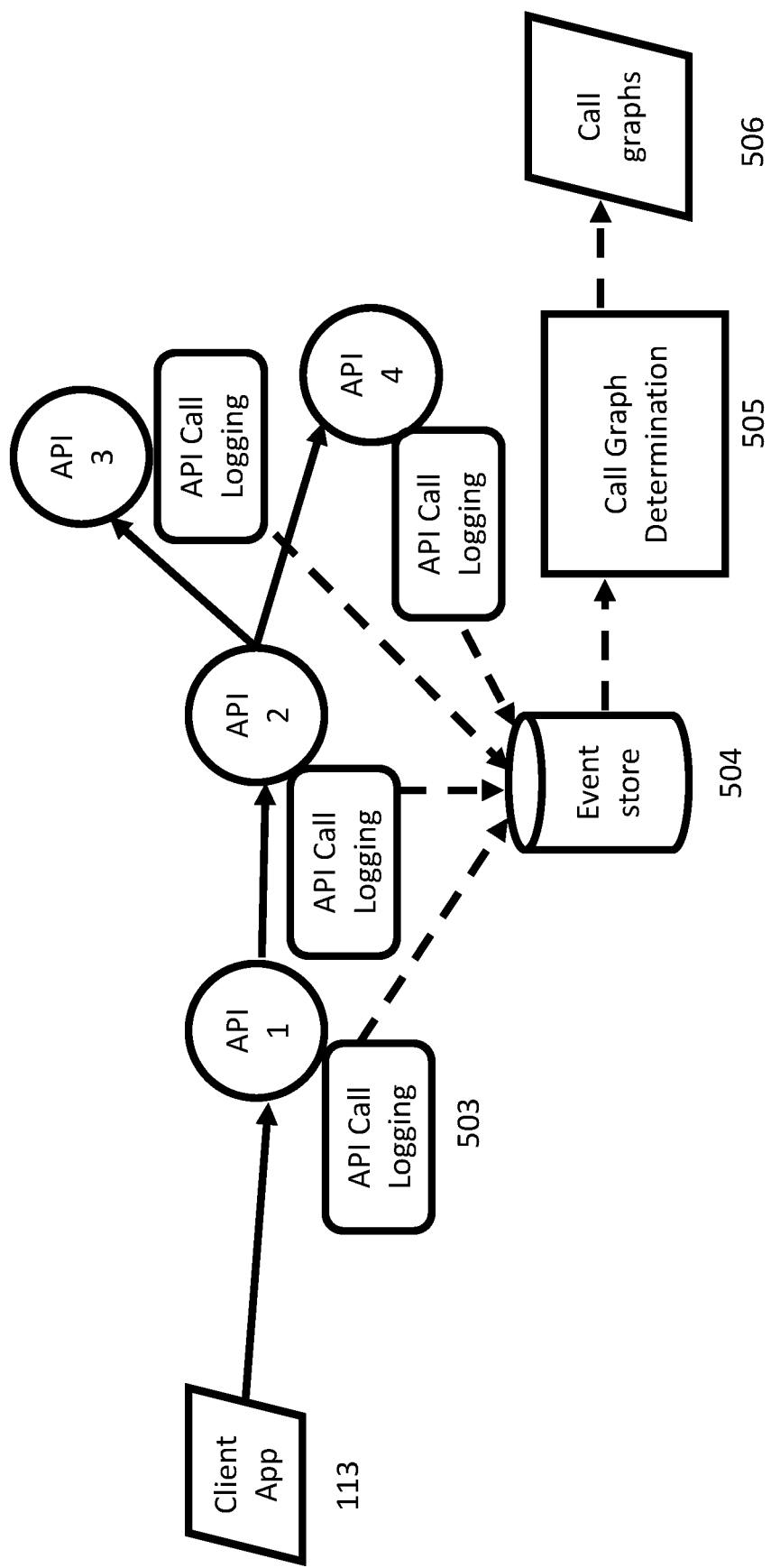
FIG. 7 illustrates uses API call logs functionality to determine an API call graph, according to some implementations.

As illustrated in FIG. 7, API call logging functionality 503 is used to log calls of multiple APIs of a multi-API transaction at runtime (APIs 1-4 are illustrated in FIG. 7 as an example, but the actual number can be much larger). A multi-API call transaction comprises a call to an initial API, and calls made to subsequent APIs by the initial API and by other subsequent APIs. In the example illustrated in FIG. 7, API 1 calls API 2, which in turn calls APIs 3 and 4. In practice, the execution chain on a transaction may be wider and/or deeper. As illustrated in FIG. 7, the logs of all the API calls are stored, for example in an event store 504, which can be in the form of any suitable storage mechanism such as a database or an in-memory data structure. Different mechanisms for logging API calls are known to those of ordinary skill in the relevant art, and any API call logging mechanism may be used in this context as desired. The combined API logs in the event store 504 may be used in the generation of an API call graph 506. Call graph generation is described in more detail below.

It is to be understood that the API call logs from the multiple APIs in the event store 504 are in the form of separate logs for separate API calls, and without additional processing and analysis by the runtime API security system 101 as described herein, these separate logs are not indicative of the relationships between the various APIs, or the flow of the execution of the transaction. In other words, there is a separate log for each API call, but there is no transaction level log showing the calling hierarchy, order of execution, or passing of data between APIs. It is further to be understood that in the implementation being described, the runtime API security system 101 does not have access to the API specifications or the code of the APIs. Under these circumstances, in order to generate an API call graph 506 identifying the sequence of API calls made during a multi-API transaction, the runtime API security system 101 identifies data objects used by the multiple APIs in the logs, and performs the consistent data field labelling functionality described above across the logs. In other words, specific data labels are assigned to specific fields of data objects used by the multiple logged APIs, where the specific data labels provide consistent identification of data fields of specific data types across the multiple APIs.

Based on the consistent identification of data fields of specific data types across the multiple APIs, linkages between specific ones of the multiple APIs are identified. More specifically, one or common data field used by more than one of the multiple APIs can be used to establish these linkages. Because all of the data fields of each specific data type across all of the APIs have been assigned the same label, regardless of how the specific data field is referenced by the different ones of the multiple APIs, the use of common data fields across multiple APIs can be identified. Establishing linkages based on common data fields is described in more detail below.

Figure 8:
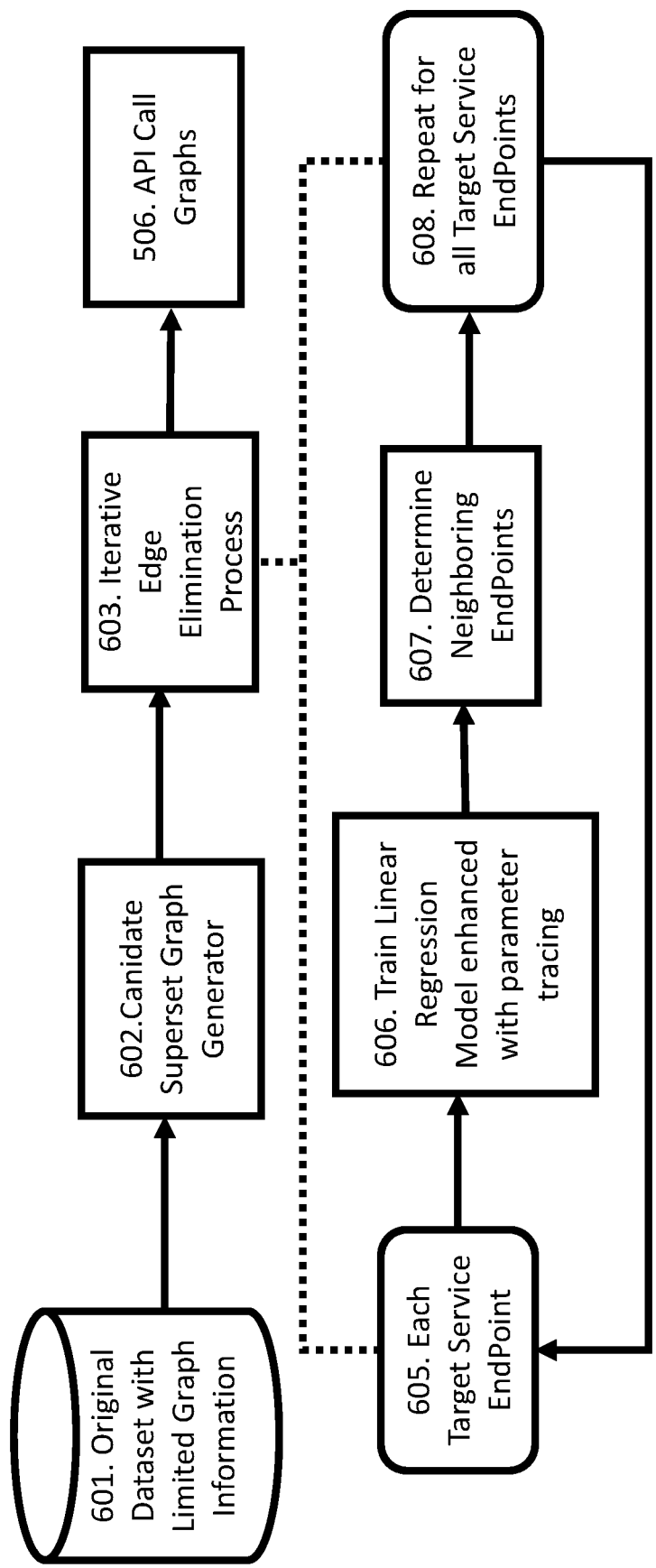
FIG. 8 illustrates constructing an API call graph, according to some implementations.

Turning now to FIG. 8, the constructing of an API call graph 506 according to one example implementation is now described in more detail. The runtime API security system 101 may identify a sequence of APIs in a multi-API transaction from the collection of API call logs. Information from the API call logs are loaded from the event store 504 into a dataset 601. This dataset 601 includes the limited information available from the logs concerning the flow of execution between APIs (e.g., sources addresses, destination addresses, timestamps, etc.). A candidate superset graph generator 602 of the runtime API security system 101 processes the dataset 601 to generate initial superset graphs by collating the sequence of API calls following a given API call within a stipulated time window. The initial superset graphs are further processed by an iterative edge-elimination process 603. The iterative process starts with a set of targeted endpoints. The initial set of targeted endpoints can be all the API services in the API call logs. For each one of the service endpoints 605, a linear regression model may be created by a training process 606. In one implementation, a machine learning training process is implemented to build a model which expresses the number of API calls observed for the target API endpoint, as a function of number of calls observed for all its neighbors observed in the initial superset graph. Once the model is trained, neighboring endpoints may be determined 607 by using the linear regression coefficients associated within individual neighbors as independent variables for filtering, thus eliminating the edges by separating qualifying neighbors from disqualified ones. The process may be repeated 608 until all target endpoints are processed, resulting in a robust API call graph 506.

The linear regression model 606 may be further enhanced by tracing API level parameters as input and output of a particular service. For one simplified example, suppose a client app 113 calls API 1 with specific input, and this results in a call from API 1 to API 2 in the backend, with one or more parameters that were passed to API 1 being passed in turn to API 2. Tracing passed parameters can further enhance the capability of a linear regression model to determine neighbors in a graph. In some implementations, in a fairly common situation when randomly generated values are present (such as a session identifier or an order tracking number), the parameter tracing of such unique values can significantly enhance the efficiency and accuracy of the linear regression model.

Figure 9:
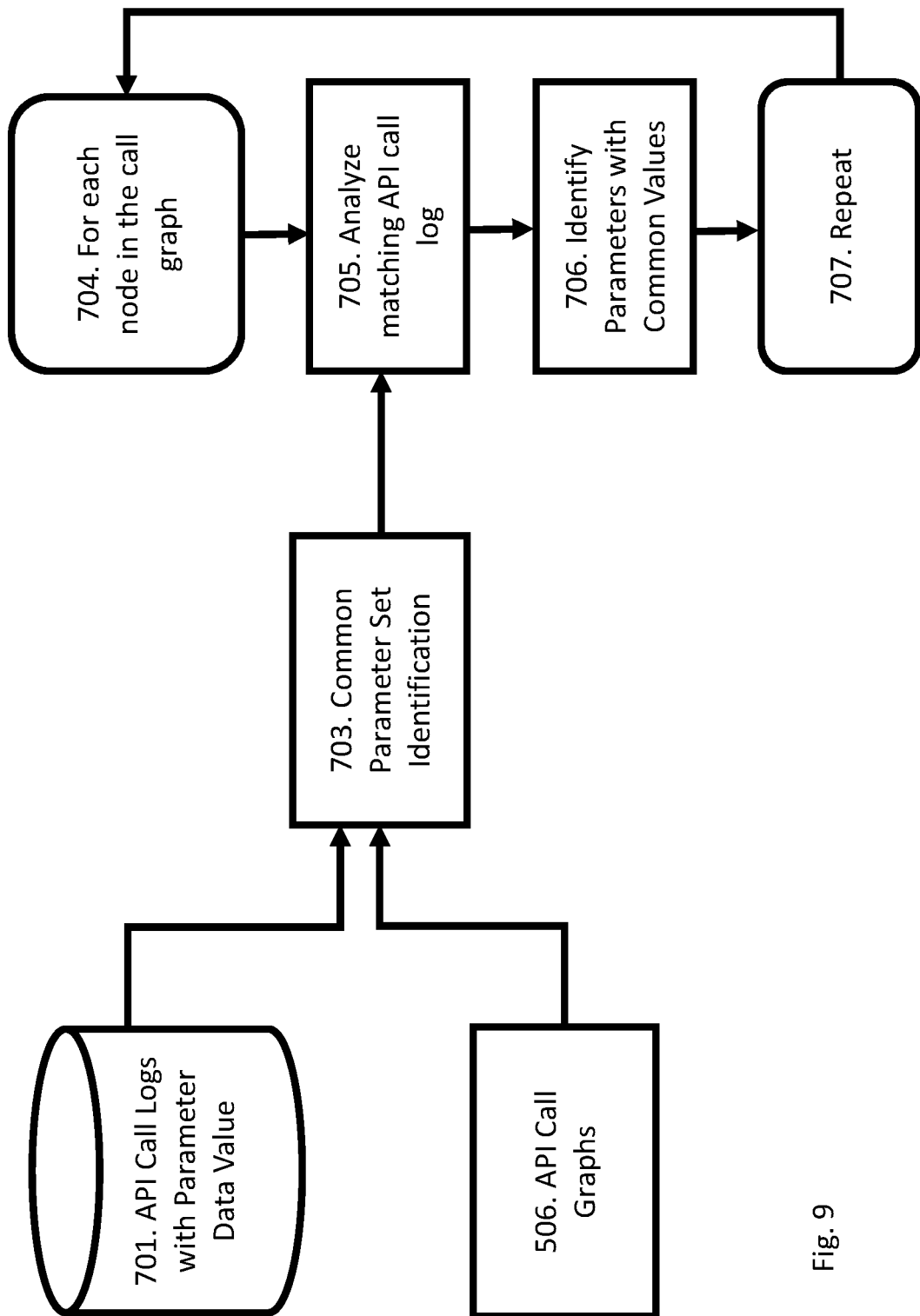
FIG. 9 illustrates determining linkages between API calls, according to some implementations.

Turning now to FIG. 9, the use of parameter tracing in the identification and use of linkages between specific ones of the multiple APIs is described in greater detail. Identifying at least one common data field used by more than one of the multiple APIs can be used to establish these linkages. Recall that common data field have been assigned the same labels, regardless of how the specific data fields are referenced by the various ones of the multiple APIs. Thus, parameter tracing may be applied to either a single service's input/output parameters or a chain of services correlating all of their input/output parameters.

Once an initial API call graph 506 is identified, common parameters flowing across an API transaction can be identified. A common flow parameter set refers to the set of API call parameters through which an input or output value is passed from one service to another within a transaction identified by an API call graph. Using the example described above, a transaction consists of API calls first initiated by a client app 113 to API 1, which calls API 2, which in turn calls APIs 2 and 3. For illustration purpose, suppose for example there is a "user account ID" parameter passed from the client app to API 1, from API 1 to API 2, and then from API 2 to API 3. Due to differences in service implementation, such "user account ID" parameter might be named "uid" in API 1, "u" in API 2, and "id" in API 3. The resulting collection of "uid," "u," and "id" can be thought of as a set of common flow parameters. Because of the consistent labelling, each member of the set common flow parameters has a common label, for example "user account ID," and hence the common parameter can be used to trace the calling sequence from API 1 to API 2 to API 3. This is an example of a set of one common parameter, but linkages between API calls can be established by using larger sets of common parameters, such as, for example, "first name" and "last name."

In the example common parameter identification process illustrated in FIG. 9, initial API call graphs and API call log data with commonly labelled data fields 701 are used to determine common parameter sets. The common parameter set identification process 703 is iterative, and is repeated for each API call in the transaction, represented as a node in the graph. For each API call in the API call graph, relevant API call log data is analyzed 705. API parameters with matching data label values in the log are identified 706, to create common parameter sets for specific ones of the calls from one API to another. The process is repeated 707 until all API calls within the initial graph have been processed. The linkages can be utilized to establish an accurate API call graph 506 identifying a sequence of API calls made during a specific multi-API transaction.

A multi-API security policy that covers the multiple API calls of the multi-API transaction can be defined, to prohibit specific actions concerning specific types of data fields, the specific types of data fields being consistently identified across the multiple APIs by specific data labels, regardless of how the specific types of data are identified at an API specification level or at a code level. This multi-API security policy defines a security policy that is not limited to a single API call, but spans an entire multi-API call transaction. For example, in some geo-regions (e.g., Germany), local regulations require that services (e.g., a food delivery app) do not transmit any customer supplied data to any sub-service outside of the same geo-region. Thus, a relevant security policy would require that the food delivery app not submit any customer data such as a credit card number for authentication or processing, or a name and address for delivery or mapping, to any service located outside of the geo-region. Any attempt by the initial API server called by the client app to call an API of a service located outside of the geo-region, or of any subservice to make such a call, should be flagged as a security policy violation. The multi-API approach described herein enables the definition and enforcement of such a multi-API security policy. In other words, using the API call graph 506 identifying the sequence of API calls can be used to enforce the multi-API security policy that covers multiple API calls of the multi-API transaction.

Enforcing the policy can take the form of, for example, using the API call graph to track the flow of execution of the multi-API transaction at runtime, and detecting an action in the tracked flow of execution that violates the multi-API security policy (for example, an action in the tracked flow of execution of the multi-API transaction that attempts to gain access to sensitive data in violation of the multi-API security policy). A security action can then be performed, in response to detecting the violation of the multi-API security policy. For example, execution of the action that violates the policy can be blocked.

Figure 10:
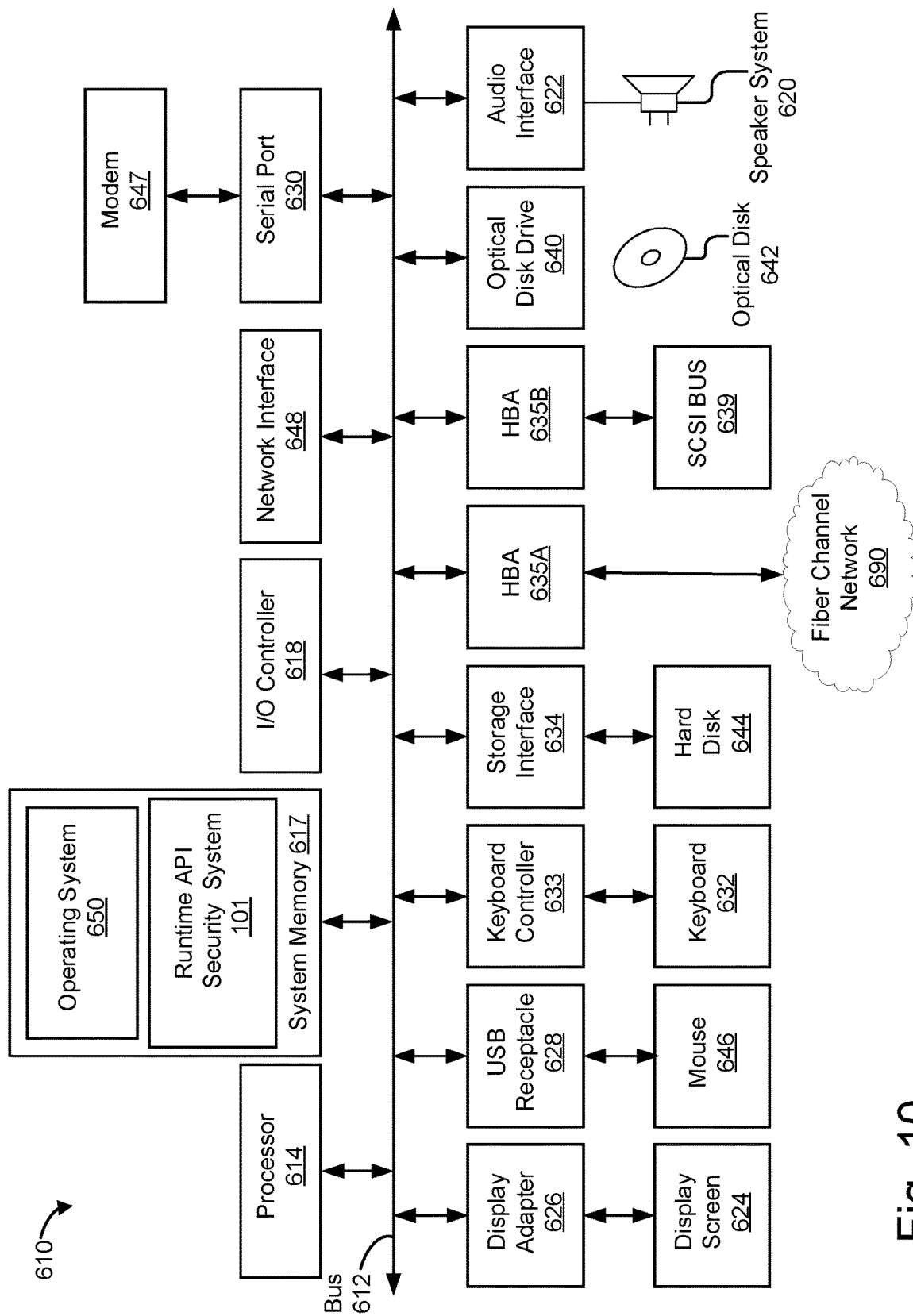
FIG. 10 is a block diagram of a computer system suitable for implementing a runtime API securing manager system, according to some implementations.

FIG. 10 is a block diagram of an example computer system 610 suitable for implementing a runtime API security system 101. Both clients 103 and servers 105 can be implemented in the form of such computer systems 610. As illustrated, one component of the computer system 610 is a bus 612. The bus 612 communicatively couples other components of the computer system 610, such as at least one processor 614, system memory 617 (e.g., random access memory (RAM), read-only memory (ROM), flash memory), an input/output (I/O) controller 618, an audio output interface 622 communicatively coupled to an audio output device such as a speaker 620, a display adapter 626 communicatively coupled to a video output device such as a display screen 624, one or more interfaces such as Universal Serial Bus (USB) receptacles 628, serial ports 630, parallel ports (not illustrated), etc., a keyboard controller 633 communicatively coupled to a keyboard 632, a storage interface 634 communicatively coupled to one or more hard disk(s) 644 (or other form(s) of storage media), a host bus adapter (HBA) interface card 635A configured to connect with a Fibre Channel (FC) network 690, an HBA interface card 635B configured to connect to a SCSI bus 639, an optical disk drive 640 configured to receive an optical disk 642, a mouse 646 (or other pointing device) coupled to the bus 612, e.g., via a USB receptacle 628, a modem 647 coupled to bus 612, e.g., via a serial port 630, and one or more wired and/or wireless network interface(s) 648 coupled, e.g., directly to bus 612.

Other components (not illustrated) may be connected in a similar manner (e.g., document scanners, digital cameras, printers, etc.). Conversely, all of the components illustrated in FIG. 10 need not be present (e.g., smartphones and tablets typically do not have optical disk drives 640, external keyboards 632 or external pointing devices 646, although various external components can be coupled to mobile computing devices via, e.g., USB receptacles 628). The various components can be interconnected in different ways from that shown in FIG. 10.

The bus 612 allows data communication between the processor 614 and system memory 617, which, as noted above may include ROM and/or flash memory as well as RAM. The RAM is typically the main memory into which the operating system 650 and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 614. Application programs can also be loaded into system memory 617 from a remote location (i.e., a remotely located computer system 610), for example via the network interface 648 or modem 647. In FIG. 10, the runtime API security system 101 is illustrated as residing in system memory 617.

The storage interface 634 is coupled to one or more hard disks 644 (and/or other standard storage media). The hard disk(s) 644 may be a part of computer system 610 or may be physically separate and accessed through other interface systems.

The network interface 648 and/or modem 647 can be directly or indirectly communicatively coupled to a network 107 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for dynamically enforcing, at runtime, a multi-API security policy that covers multiple API calls of a multi-API transaction, the method comprising:
   reading logs of calls to multiple APIs of a multi-API transaction, the multi-API call transaction comprising a call to an initial API, and calls made to subsequent APIs by the initial API and by other subsequent APIs;
   identifying, from the logs, data objects used by the multiple APIs;
   assigning specific data labels to specific fields of data objects used by the multiple APIs, the specific data labels providing consistent identification of data fields of specific types across the multiple APIs;
   identifying linkages between specific ones of the multiple APIs, based on the consistent identification of data fields of specific types across the multiple APIs;
   grouping limited information available concerning the multiple APIs and relationships between them in a candidate superset graph;
   growing the candidate superset graph by an iterative edge elimination process to construct an API call graph identifying a sequence of API calls made during the multi-API transaction, wherein a linear regression model is used to determine neighbors of service endpoints; and
   using the API call graph identifying the sequence of API calls to enforce the multi-API security policy that covers multiple API calls of the multi-API transaction, the multi-API security policy using the specific data labels to consistently identify data fields of specific types across the multiple APIs.

2. The method of claim 1 further comprising:
   logging calls to multiple APIs of the multi-API transaction at runtime, the multi-API call transaction comprising a call to an initial API, and calls made to subsequent APIs by the initial API and by other subsequent APIs.

3. The method of claim 1 wherein assigning specific data labels to specific fields of data objects used by the multiple APIs further comprises:
   programmatically analyzing the data objects used the multiple APIs;

programmatically identifying specific types of data fields of the data objects; and automatically assigning data labels to each one of the identified data fields, each assigned data label identifying a corresponding specific type.

4. The method of claim 3 wherein programmatically identifying specific types of data fields of the data objects further comprises:

programmatically identifying specific types of data fields of the data objects using heuristics.

5. The method of claim 3 wherein programmatically identifying specific types of data fields of the data objects further comprises:

programmatically identifying specific types of data fields of the data objects using a trained machine learning model.

6. The method of claim 1 further comprising:

defining the multi-API security policy that covers multiple API calls of the multi-API transaction to prohibit specific actions concerning specific types of data fields, the specific types of data fields being consistently identified across the multiple APIs by specific data labels, regardless of how the specific types of data are identified at an API specification level or at a code level.

7. The method of claim 1 wherein identifying, from the logs, data objects used by the multiple APIs further comprises:

identifying data objects from a group consisting of: one or more parameters passed into an API, a value returned by an API, a data object read from and/or written to by reference by an API.

8. The method of claim 1 wherein:

the method is performed without access to a specification of any of the multiple APIs and without access to code of any of the multiple APIs.

9. The method of claim 1 wherein identifying linkages between specific ones of the multiple APIs, based on the consistent identification of data fields of specific types across the multiple APIs further comprises:

identifying at least one common data field used by more than one of the multiple APIs, the at least one common data field having been assigned the same label, regardless of how the specific data field is referenced by the more than one of the multiple APIs.

10. The method of claim 1 further comprising:

utilizing the identifying linkages between specific ones of the multiple APIs to determine neighbors of service endpoints.

11. The method of claim 1 wherein using the API call graph identifying the sequence of API calls to enforce the multi-API security policy that covers multiple API calls of the multi-API transaction further comprises:

using the API call graph identifying the sequence of API calls to track the flow of execution of the multi-API transaction, at runtime; and detecting, at runtime, an action in the tracked flow of execution that violates the multi-API security policy.

12. The method of claim 11 wherein detecting, at runtime, an action in the tracked flow of execution that violates the multi-API security policy further comprises:

detecting, at runtime, an action in the tracked flow of execution of the multi-API transaction that attempts to gain access to sensitive data in violation of the multi-API security policy.

13. The method of claim 11 further comprising:

executing a security action at runtime, in response to detecting the violation of the multi-API security policy.

14. The method of claim 13 wherein executing a security action at runtime, in response to detecting the violation of the multi-API security policy further comprises:

blocking execution of an action in the tracked flow of execution of the multi-API transaction that violates the multi-API security policy.

15. At least one non-transitory computer-readable storage medium for dynamically enforcing, at runtime, a multi-API security policy that covers multiple API calls of a multi-API transaction, the at least one non-transitory computer-readable storage medium storing computer executable instructions that, when loaded into computer memory and executed by at least one processor of a computing device, cause the computing device to perform the following steps:

reading logs of calls to multiple APIs of a multi-API transaction, the multi-API call transaction comprising a call to an initial API, and calls made to subsequent APIs by the initial API and by other subsequent APIs;

identifying, from the logs, data objects used by the multiple APIs;

assigning specific data labels to specific fields of data objects used by the multiple APIs, the specific data labels providing consistent identification of data fields of specific types across the multiple APIs;

identifying linkages between specific ones of the multiple APIs, based on the consistent identification of data fields of specific types across the multiple APIs;

grouping limited information available concerning the multiple APIs and relationships between them in a candidate superset graph;

growing the candidate superset graph by an iterative edge elimination process to construct an API call graph identifying a sequence of API calls made during the multi-API transaction, wherein a linear regression model is used to determine neighbors of service endpoints; and using the API call graph identifying the sequence of API calls to enforce the multi-API security policy that covers multiple API calls of the multi-API transaction, the multi-API security policy using the specific data labels to consistently identify data fields of specific types across the multiple APIs.

16. The at least one non-transitory computer-readable storage medium of claim 15 wherein using the API call graph identifying the sequence of API calls to enforce the multi-API security policy that covers multiple API calls of the multi-API transaction further comprises:

using the API call graph identifying the sequence of API calls to track the flow of execution of the multi-API transaction, at runtime; and detecting, at runtime, an action in the tracked flow of execution that violates the multi-API security policy.

17. A computer system for dynamically enforcing, at runtime, a multi-API security policy that covers multiple API calls of a multi-API transaction, the computer system comprising:

at least one processor;

system memory;

a log reading module residing in the system memory, the log reading module being configured to read logs of calls to multiple APIs of a multi-API transaction, the multi-API call transaction comprising a call to an initial API, and calls made to subsequent APIs by the initial API and by other subsequent APIs;

a data object identifying module residing in the system memory, the data object identifying module being configured to identify, from the logs, data objects used by the multiple APIs;

an assigning module residing in the system memory, the assigning module being configured to assign specific data labels to specific fields of data objects used by the multiple APIs, the specific data labels providing consistent identification of data fields of specific types across the multiple APIs;

a linkage identifying module residing in the system memory, the linkage identifying module being configured to identify linkages between specific ones of the multiple APIs, based on the consistent identification of data fields of specific types across the multiple APIs;

a call graph constructing module residing in the system memory, the call graph constructing module being configured to:

group limited information available concerning the multiple APIs and relationships between them in a candidate superset graph; and grow the candidate superset graph by an iterative edge elimination process to construct an API call graph identifying a sequence of API calls made during the multi-API transaction, wherein a linear regression model is used to determine neighbors of service endpoints; and a policy enforcing module residing in the system memory, the policy enforcing module being configured to use the API call graph identifying the sequence of API calls to enforce the multi-API security policy that covers multiple API calls of the multi-API transaction, the multi-API security policy using the specific data labels to consistently identify data fields of specific types across the multiple APIs.

\* \* \* \* \*